July 10, 1928.  
G. R. HALL  
AWNING  
Filed March 23, 1927    2 Sheets-Sheet 1
1,677,080
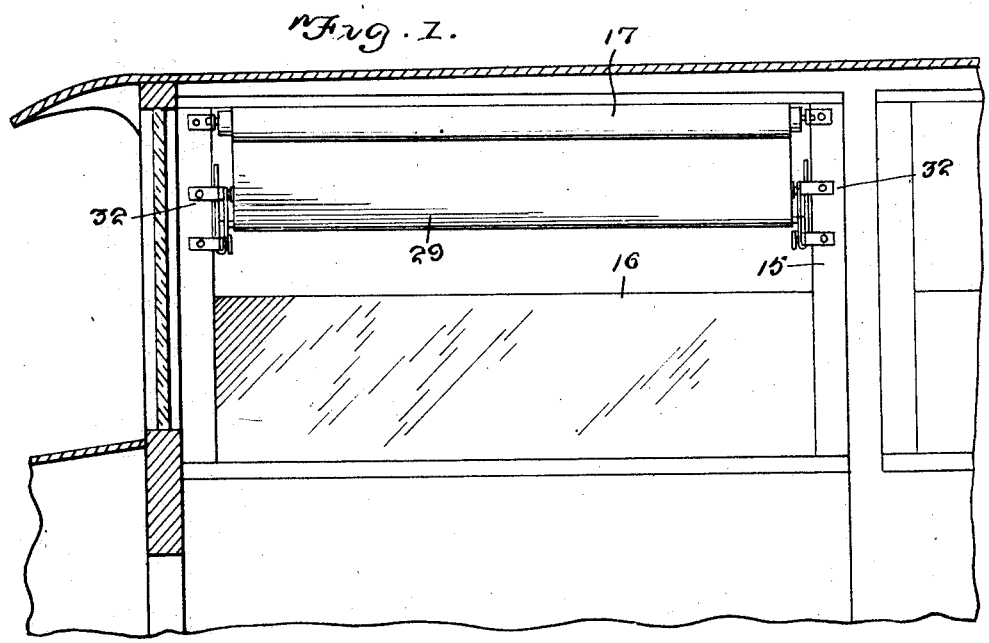
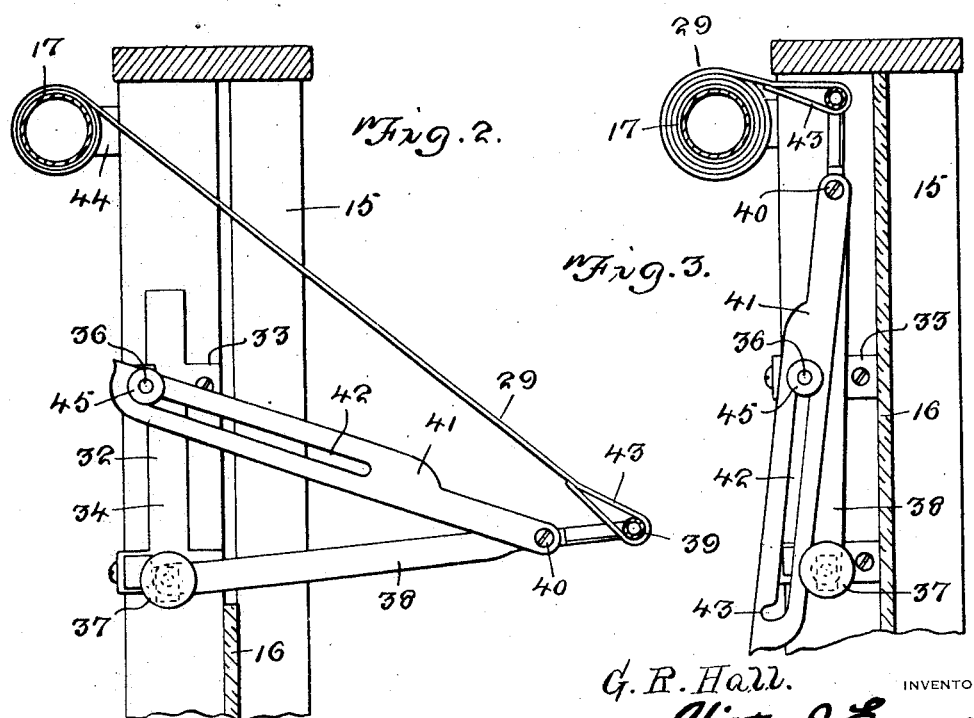
G. R. Hall, INVENTOR  
BY Victor J. Evans, ATTORNEY July 10, 1928.  
G. R. HALL  
AWNING  
Filed March 23, 1927  
1,677,080  
2 Sheets-Sheet 2
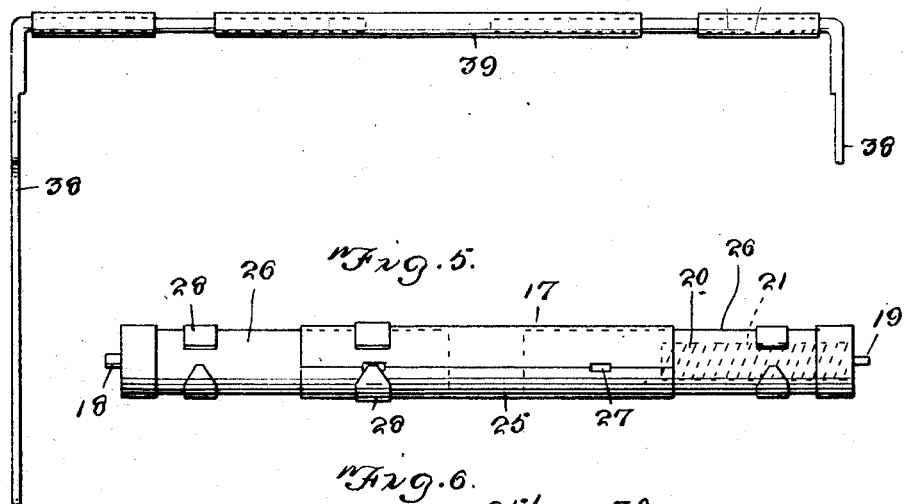
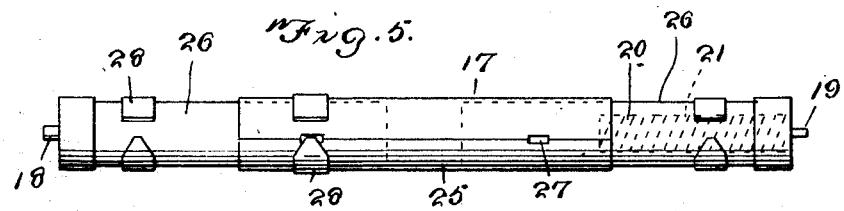
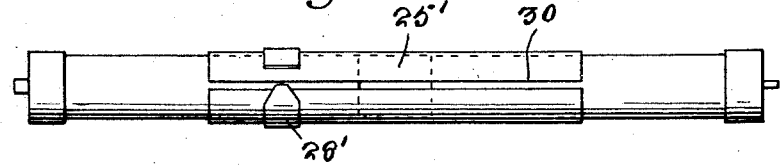
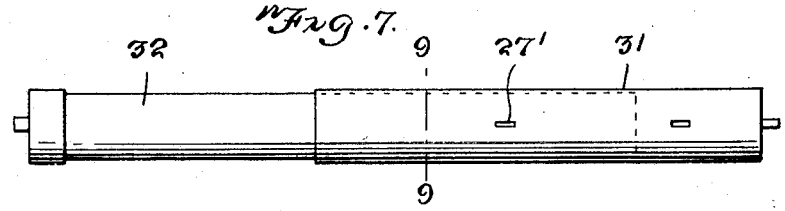
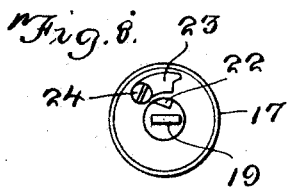
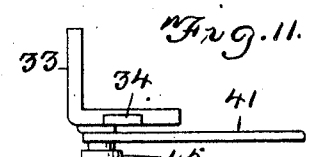
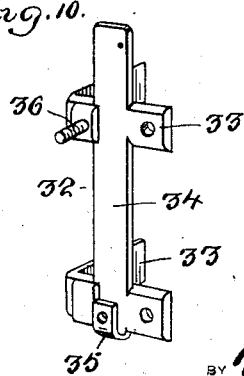
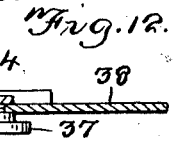
G. R. Hall INVENTOR
BY Victor J. Evans
ATTORNEY Patented July 10, 1928.

1,677,080

UNITED STATES PATENT OFFICE.

GEORGE R. HALL, OF WATERVILLE, KANSAS.

AWNING.

Application filed March 23, 1927. Serial No. 177,756.

This invention relates to improvements in awnings or shades especially adapted for use upon the windows of automobiles.

An object of the invention is to provide a spring actuated awning which may be held in extended position for use, and which will be automatically rolled to an out of the way position when the holding means is released.

Another object of the invention is to provide an awning which includes a spring actuated roller having means to initially tension the same, together with means to subsequently permit of the free operation of the roller in either direction.

Another object of the invention is the provision of novel means to mount the awning frame upon the automobile window.

With the above and other objects in view, the invention further includes the following novel features and details of construction, to be hereinafter more fully described, illustrated in the accompanying drawings and pointed out in the appended claim.

In the drawings:—

Figure 1 is a sectional view taken through a portion of an automobile with the invention applied.

Figure 2 is an enlarged fragmentary transverse section with the awning extended.

Figure 3 is a similar view showing the awning rolled.

Figure 4 is a plan view of the pivoted U-shaped frame partly broken away.

Figure 5 is a view of the spring roller.

Figure 6 is a view showing a slightly different form of roller.

Figure 7 is a view of still another form of roller.

Figure 8 is an end view of one of the rollers.

Figure 9 is a section on the line 9—9 of Figure 7.

Figure 10 is a perspective view of one of the window brackets.

Figure 11 is a fragmentary plan view of one of the brackets and showing a portion of the inner end of one of the brace bars.

Figure 12 is a fragmentary view partly in section showing the manner of pivotally mounting the inner ends of the U-shaped frame.

Referring to the drawings in detail wherein like characters of reference denote corresponding parts, the reference character 15 indicates a portion of the window frame of an automobile, the window glass being shown at 16.

The awning which forms the subject matter of the present invention is shown as attached to the window frame and comprises a spring actuated roller 17. This roller includes a fixed pintle 18 at one end thereof and a relatively movable pintle 19 at the opposite end. The pintle 19 is formed by an extension of a rod 20 which is surrounded by a spring 21. One end of this spring is attached to the rod 20 and the opposite end to the interior of the roller 17 after the manner of the ordinary spring shade roller. The extended end of the rod 20 is provided with a notch 22 which is adapted to be engaged by a dog 23, the latter being pivotally secured to the end of the roller 17 by means of a screw 24.

The shade roller may be of various constructions, the purpose being to provide an extensible roller which may be adjusted to fit windows of different widths. The roller indicated in Figure 5 comprises a central tubular section 25 which receives in its opposite ends wood sections 26. The section 25 is provided with openings 27 which receive the inturned ends of spring clips 28, so as to engage the inner edge of a shade 29 to secure the shade to the roller. Additional spring clips 28 may be mounted upon the outer ends of the rollers.

The roller illustrated in Figure 6 is of substantially the same construction except that the inner tubular section 26' is of spring metal and is longitudinally split as shown at 30. The edge of the shade is adapted to be inserted through the slit 30 so as to attach the shade to the roller. Spring clips 28' may also be used in this form of the invention if desired.

The roller shown in Figure 7 is formed of two sections, a tubular section 31 and a solid wooden section 32 which is slidable within the tubular section. This tubular section is provided with openings 27' similar to the openings 27 which are provided in the roller shown in Figure 5.

Secured to opposite sides of the window frame are brackets 32. These brackets each comprise horizontally disposed spaced L-shaped attaching bars 33 which are provided with openings for the passage of fastening devices. The bars 33 are connected by a vertically disposed connecting bar 34, while from the lower attaching arm 33 there extends an offset apertured ear 35. A pivot stud 36 extends from the upper L-shaped bar 33.

Pivotally secured to the offset ears 35 by means of a pivot screw 37 are the inner ends of bars 38. These bars form a part of a U-shaped frame and this frame includes an extensible bar 39 which connects the outer ends of the arms 38. The bar 39 is of telescopic construction so as to permit of its being adjusted to conform to the width of the window frame.

Pivotally secured to the arms 38 as shown at 40 are the outer ends of brace bars 41. These brace bars are provided with longitudinally extending slots 42 whose inner ends are offset as shown at 43. The slots 42 are adapted to receive the pivot studs 36 so that the bars 41 may slide upon these studs to hold the U-shaped frame in position. The outer edge of the shade 29 is looped around the bar 39 as shown at 43.

Initially, the spring 21 of the shade roller is properly tensioned and the roller is inserted in the roller fixtures 44 which are attached to the window frame. The U-shaped frame and brace bars are adjusted in position and the shade 29 is extended. The dog 23 which has been engaged in the notch 22 to hold the spring 21 tensioned is disengaged from within the notch and the screw 24 is adjusted so as to frictionally hold the dog in disengaged position. The shade 29 may thus be extended and held in extended position by engaging the stud 36 within the offset portion 43 of the slot 42. As soon as the studs 36 are disengaged from the offset portion of the slots 42, the tension of the spring will draw the U-shaped frame upward and roll the curtain upon the roller. The action of the awning will thus be automatic. A binding nut 45 may be mounted upon each of the studs 36 to prevent accidental inward movement of the U-shaped frame.

The invention is susceptible of various changes in its form, proportions and minor details of construction and the right is herein reserved to make such changes as properly fall within the scope of the appended claim.

Having described the invention what is claimed is:—

In a roller awning construction provided with an outwardly swinging bail and a slotted brace bar having one end pivotally secured to the bail, a bracket comprising upper and lower spaced horizontally disposed L-shaped attaching bars, a vertically disposed bar connecting the attaching bars, an offset ear extending from the lower L-shaped bar for pivotal connection with the bail, a threaded stud extending from the upper portion of the bracket to receive the slotted brace bar and a binding nut threadedly engaging the stud to bear against the brace bar and hold the bail in adjusted position.

In testimony whereof I affix my signature.

GEORGE R. HALL.